US007284404B2

(12) United States Patent
Lin

(10) Patent No.: US 7,284,404 B2
(45) Date of Patent: Oct. 23, 2007

(54) INTAKE DISTRIBUTING DEVICE OF A RIVET-NUT GUN

(76) Inventor: Yu-Ching Lin, P.O. Box 96-405, Taipei 1061 (TW)

( * ) Notice: Subject to any disclaimer, the term of this patent is extended or adjusted under 35 U.S.C. 154(b) by 214 days.

(21) Appl. No.: 11/059,398

(22) Filed: Feb. 17, 2005

(65) Prior Publication Data

US 2006/0180630 A1 Aug. 17, 2006

(51) Int. Cl.
*B21J 15/12* (2006.01)
*B21D 9/05* (2006.01)
*B23P 11/00* (2006.01)

(52) U.S. Cl. .................... 72/114; 72/391.8; 29/243.525

(58) Field of Classification Search .................. 72/114, 72/391.8, 453.17; 29/243.525, 243.526
See application file for complete search history.

(56) References Cited

U.S. PATENT DOCUMENTS 5,697,137 A * 12/1997 Frearson et al. ....... 29/243.525
6,272,899 B1 * 8/2001 Bentivogli ................ 72/391.8

* cited by examiner

*Primary Examiner*—Derris H. Banks
*Assistant Examiner*—Teresa M. Bonk
(74) *Attorney, Agent, or Firm*—Troxell Law Office, PLLC

(57) ABSTRACT

An intake distributing device of a rivet-nut gun, which comprises a body shell with two intake passages underneath; the center cylindrical hole of the body shell is mounted with a pneumatic motor assembly; the rear end of the body shell is mounted with a tail lid, which has two intake pipes to be connected and communicated with two pipes of a piston rear lid; by means of a trigger or a contact driving means, a pressure air can flow via the distributing pipes of the piston read lid to drive the rivet-nut gun to perform a riveting work and to pull out work.

5 Claims, 6 Drawing Sheets

INTAKE DISTRIBUTING DEVICE OF A RIVET-NUT GUN

BACKGROUND OF THE INVENTION

1. Field of the Invention

This invention relates to a rivet-nut gun, and particularly to a rivet-nut gun with an intake distributing device.

2. Description of the Prior Art

A conventional rivet-nut gun is usually used for mounting a rivet nut, for a hydraulic riveting work, and for pulling back a pull rod by means of a pressure air, which is to be fed and controlled by means of outer pipe connected to the body shell of the rivet-nut gun, In the present invention, which is distinguishable from a conventional rivet-nut gun, the pressure accumulator thereof has a pressure-switching device as shown in FIG. 2; the upper part of the handle is mounted with a rivet-pulling assembly; the rear end of the pressure-air-distributing base is connected with a pipe so as to have the pressure air guided to the rear part for distributing and control during riveting work; by means of the pressure-air-distributing base, two separate pipes are connected with the intake hole and the pipe of a rear assembly; however, the aforesaid pipes and assemblies are mounted in place by exposing to the outside of the rivet gun.

SUMMARY OF THE INVENTION

The prime object of the present invention is to provide an intake distributing device of a rivet-nut gun, in which the rear end of the body shell of the rivet-nut gun is furnished with a tail lid; the outer shell of the tail lid is furnished with two separate pipes, of which the lower parts are connected and communicated with two separate intake passages respectively; the upper parts of the two pipes are plugged into two intake holes of the piston rear lid; by means of the two separate pipes of the tail lid, the pressure air in the intake passage under the body shell will flow, via a distributing device on rear end of the body shell, into the pneumatic motor assembly.

Another object of the present invention is to provide an intake distributing device of a rivet-nut gun, in which the tail lid furnished on the rear end of the body shell is a single outer shell; the tail lid is designed as a cover-shaped shell, in which two separate pipes are furnished; the pressure air can be fed in via the tail lid on rear end of the body shell.

Still another object of the present invention is to provide an intake distributing device of a rivet-nut gun, in which the tail lid on the rear end of the body shell has an outer shell, and the center thereof is furnished with a plurality of small exhaust holes, from which the pressure air will be exhausted during riveting work.

A further object of the present invention is to provide an intake distributing device of a rivet-nut gun, in which the piston rear lid of the pneumatic motor assembly is furnished with two separate intake holes and one exhaust holes; the two separate intake holes are connected respectively to both sides of the cylinder chamber via the inner cylindrical holes thereof; when the pressure air enters the different intake holes, the blades and spindle in the cylinder chamber will rotate in different direction so as to have the pressure air exhausted via the exhaust hole connected with the piston rear lid, and through the small exhaust holes in the center of the outer shell of the tail lid.

Still a further object of the present invention is to provide an intake distributing device of a rivet-nut gun, in which the piston rear end of the pneumatic motor assembly is furnished with two separate pipes; one of the separate pipes is connected with a center cylindrical hole mounted with a valve base for receiving a valve; the stem of the valve extend into a center hole of the pneumatic motor assembly; during riveting work, the pull rod and the rivet nut will contact each other to push and have the valve separated from the valve base; then, the pressure air will enter the cylinder chamber to drive the blades and the spindle to rotate so as to have a rivet nut screwed and mounted on the screwed rod of the pull rod.

DETAILED DESCRIPTION OF THE PREFERRED EMBODIMENT

Figure 1:
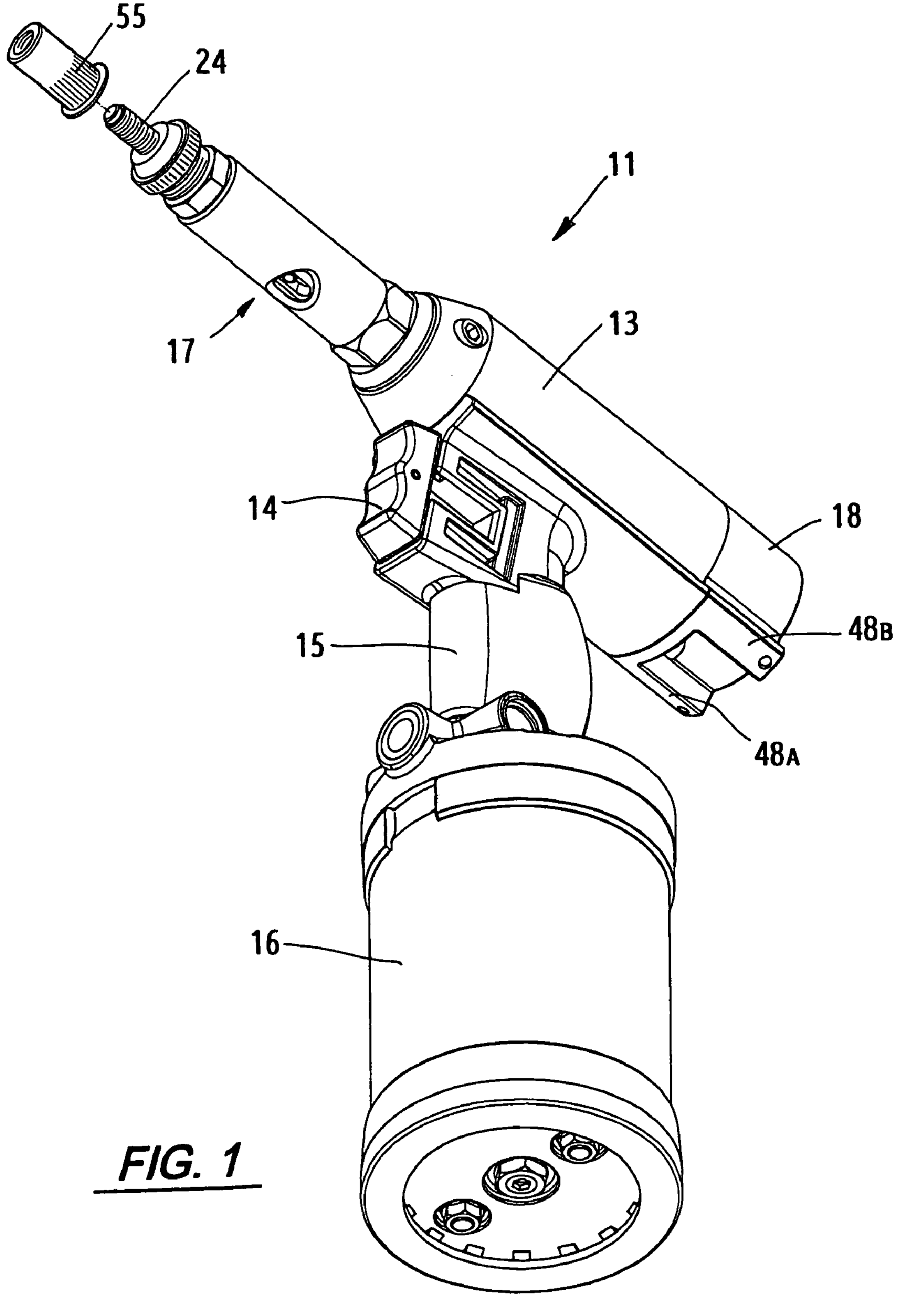
FIG. 1 is a perspective view of the present invention.
Figure 2:
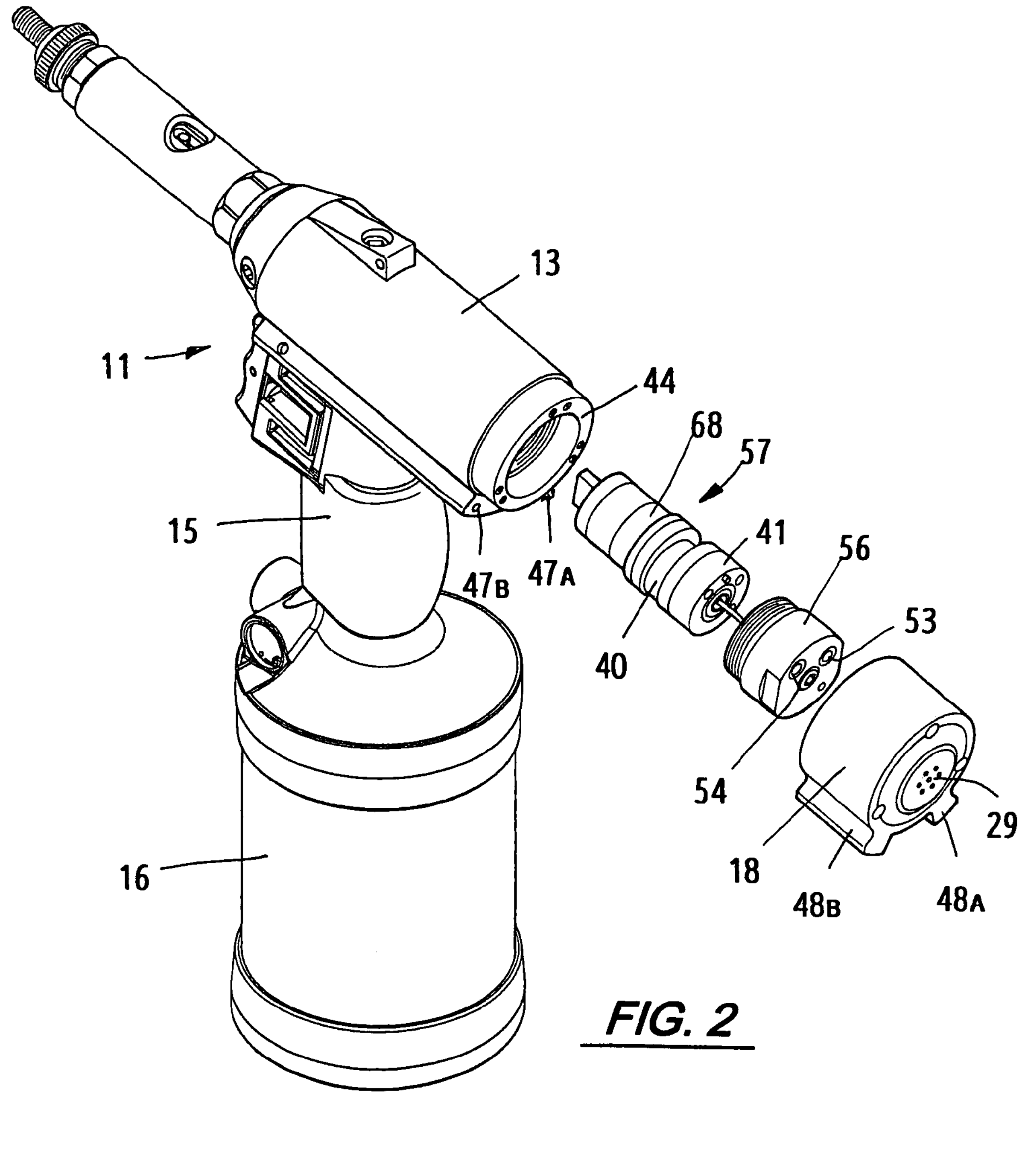
FIG. 2 is a fragmentary disassembled view of the present invention, showing the structure between the pneumatic motor assembly and the body shell.
Figure 3:
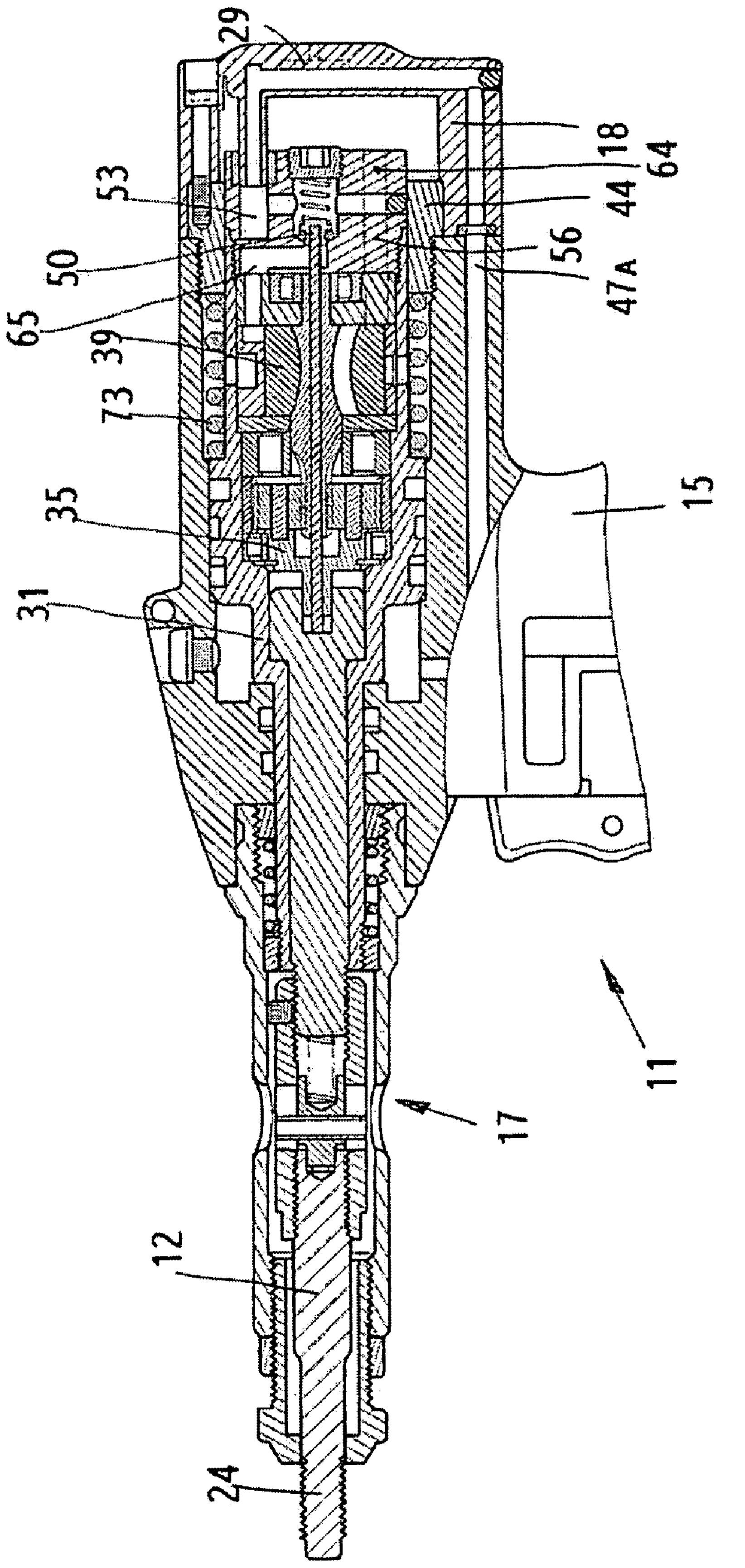
FIG. 3 is a sectional view of the present invention, showing the inner structure of the rivet-nut gun.
Figure 4:
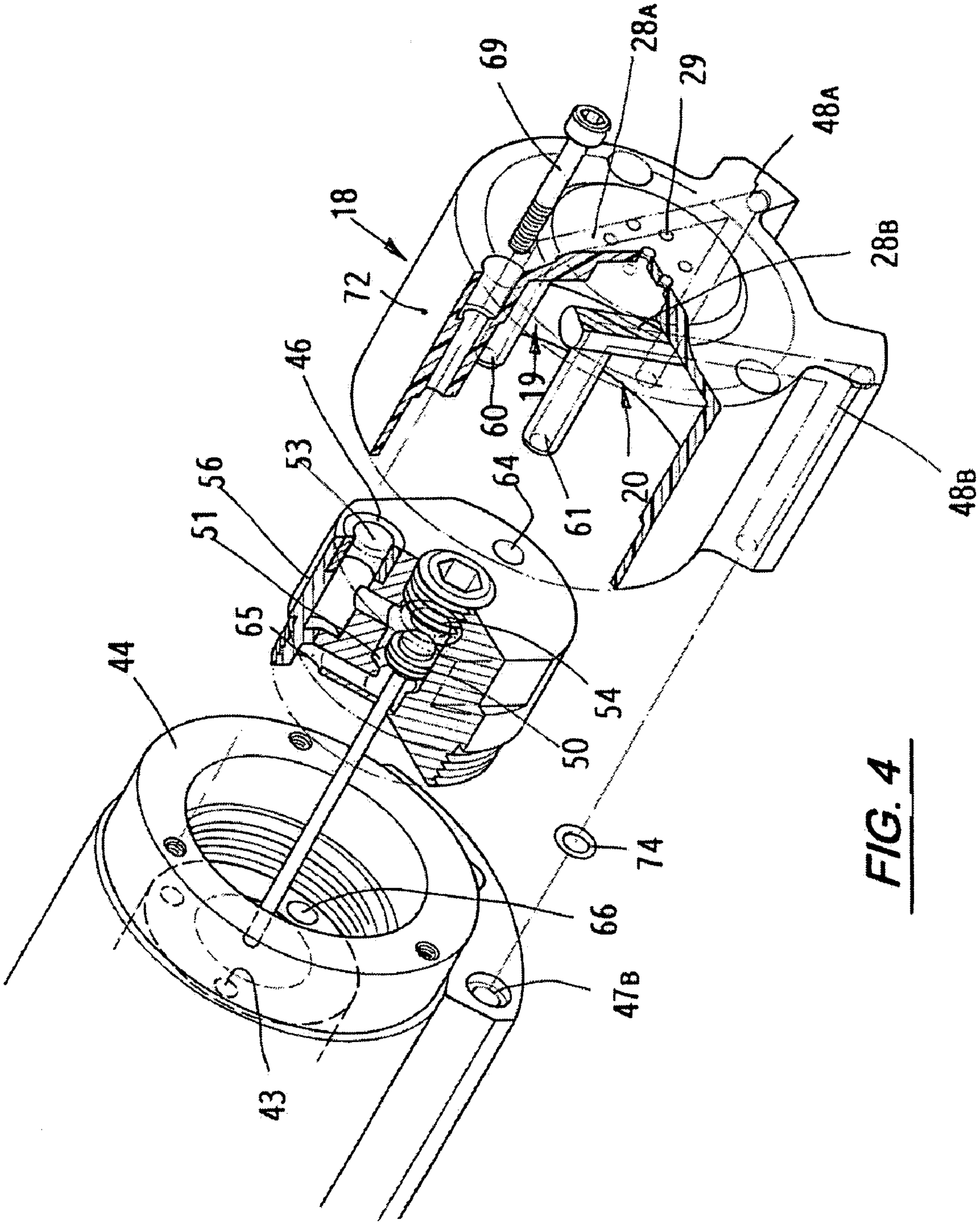
FIG. 4 is a disassembled view of the present invention, showing the structure between the piston rear lid and the tail lid of the body shell.

This invention relates to an intake distributing device of a rivet-nut gun; as shown in FIGS. 1 to 4, the center of the pull rod assembly 17 on the front end of the body shell 13 of the rivet-nut gun 11 is mounted with a pull rod 12; after a rivet nut 55 is mounted on the threaded rod 24 of the pull rod 12, the pull rod 12 can be pressed inwards by means of a contact driving method to push a valve 50 of a piston rear lid 56 to open, and to have a pressure air flowed in so as to have a rivet nut 55 riveted in place. As soon as a rivet nut 55 is mounted in place, the trigger 14 of the rivet-nut gun 11 is actuated to have the pressure air flowed into a pressure accumulator 16 under the handle 15; then, the pressure air will drive an inner piston to move and to convert into a hydraulic power, which will drive a hydraulic piston 31 to move so as to rivet a rivet nut in place. After a rivet net 55 is mounted on the pull rod 12, the trigger 14 can be pulled to have the pressure air flowed through the tail lid 18, and the cylinder chamber 40 so as to drive the blades 38 and a spindle 40 to turn, and to have the pull rod 12 screwed out of the rivet nut 55, and the riveting work will be done.

Figure 5:
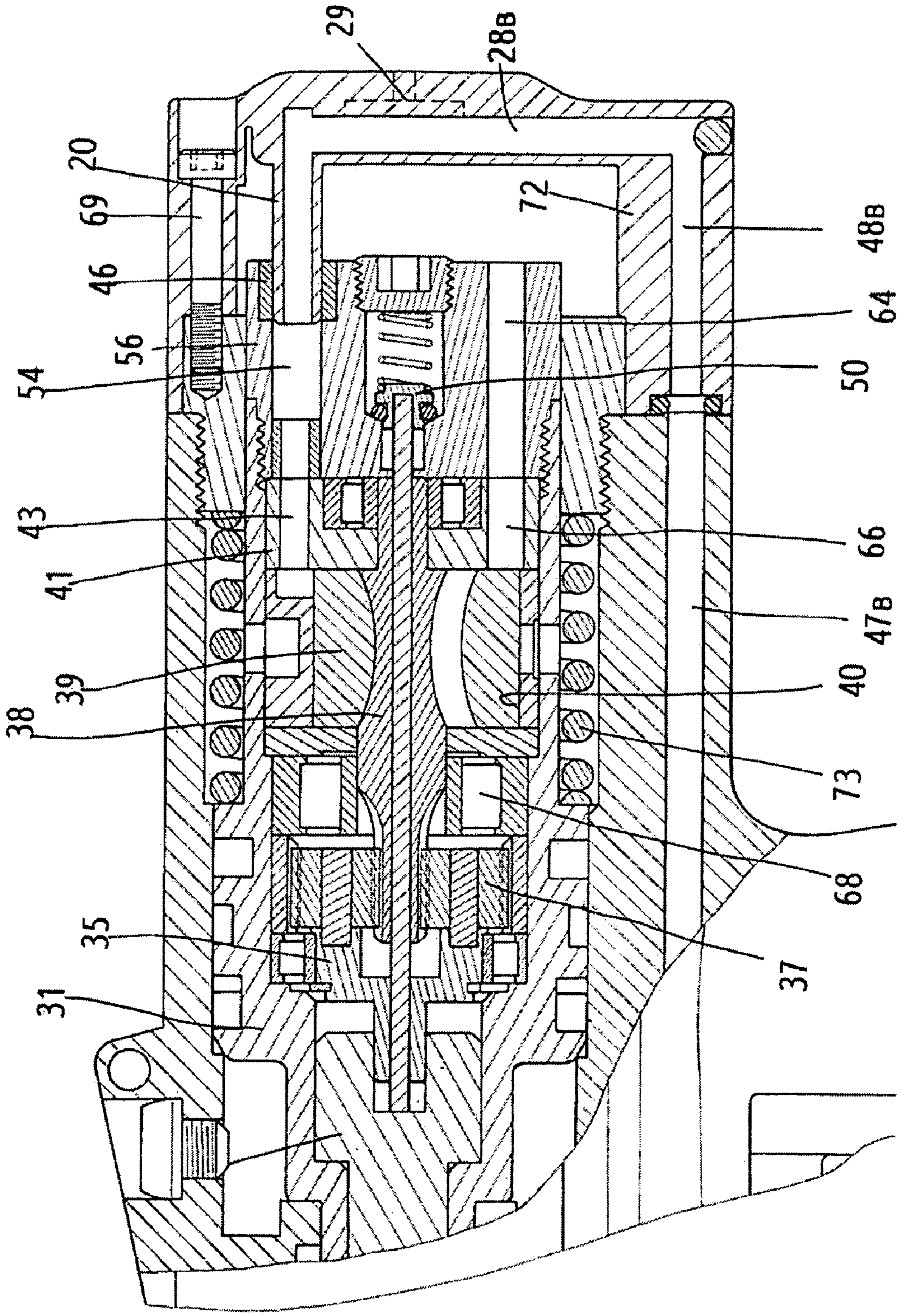
FIG. 5 is a sectional view of the present invention, showing the structure-1 among the tail lid, the pneumatic motor assembly, and the body shell of the rivet-nut gun.
Figure 6:
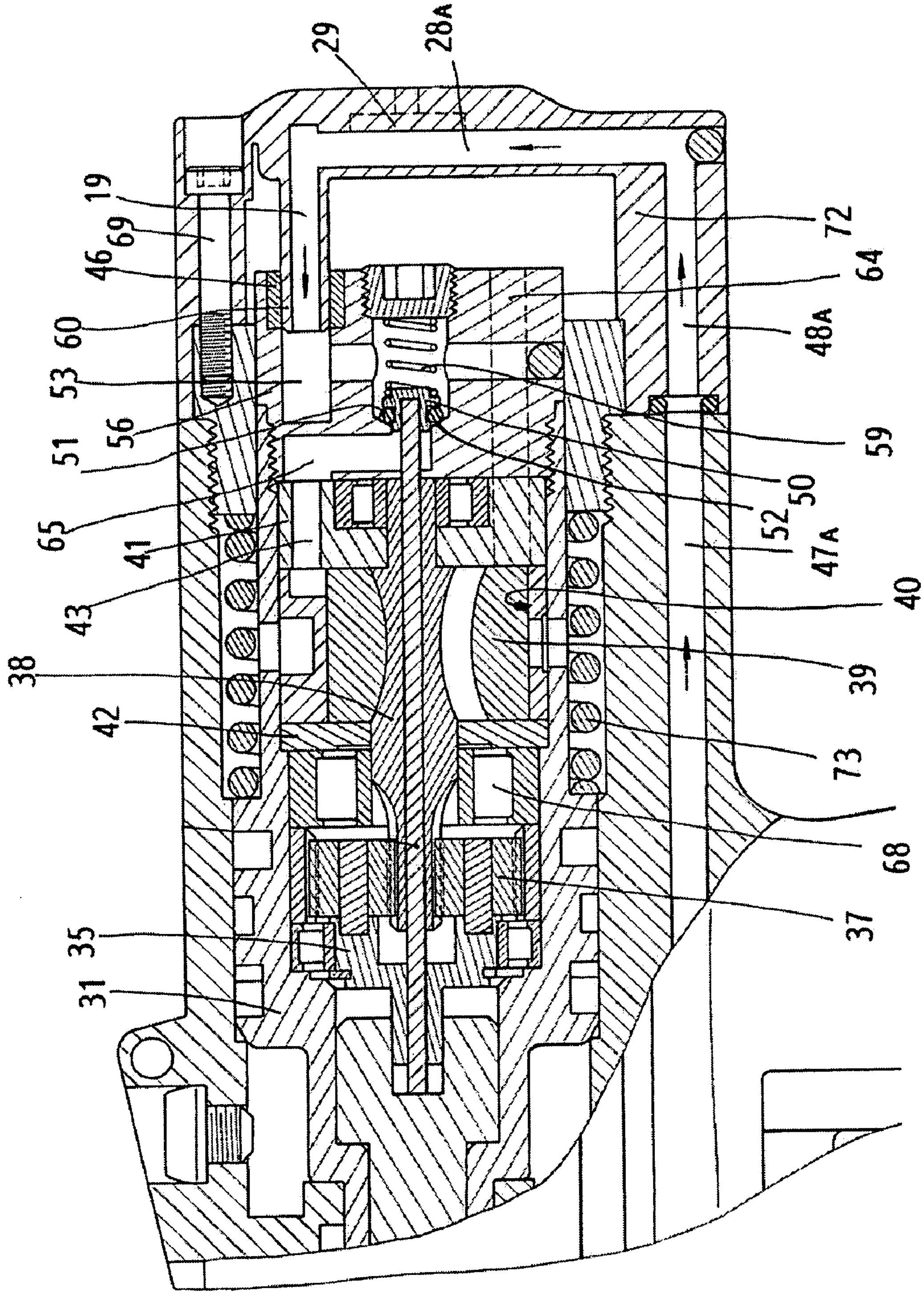
FIG. 6 is a sectional view of the present invention, showing the structure-2 among the tail lid, the pneumatic motor assembly, and the body shell of the rivet-nut gun.

Referring to FIGS. 2 to 6, the rear end hole of the body shell 13 is mounted with a hydraulic piston 31, a spring 73 and a threaded sleeve 44; a pneumatic motor assembly 57 is mounted in the center space of the hydraulic piston 31. The pneumatic motor assembly 57 includes a driving shaft 35, a retarding gear train 37, a partition ring 41, a cylinder chamber 40, a partition ring 42 and a piston rear lid 56; the cylinder chamber 40 is an eccentric member; the spindle 38 is mounted with blades 39; the upper part of the piston chamber 40 near the partition ring 41 is furnished with two intake holes, which are in communication with two cylindrical holes 43 and 67 of the partition ring 41 respectively; then, the two holes are in communication with the passage 65, the two intake holes 53 and 54, and also with two separate pipes 19 and 20 in the tail lid 18 of the body shell 13, and also with two separate intake passages 47*a* and 47*b;* then, a pressure air can flow through, by means of a control, two different intake passages 47*a* and 47*b* to have the rivet nut 55 and the pull rod 12 screwed in or out.

The piston rear lid 56 on the outer end of the pneumatic motor assembly 57 is screwed into the threaded hole of the hydraulic piston 31; one side of the piston rear lid 56 near the partition ring 41 is furnished with a passage 65, an intake hole 54 and an exhaust hole 64; between the passage 65 of the piston rear lid 56 and the partition ring 41, there is an intake cylindrical hole 43 in communication with an intake hole of the cylinder chamber 40; as soon as a pressure air flows in, the blades 39 and the spindle 38 will be driven to rotate in a positive direction. The intake passage 47 of the partition ring 41 and the cylindrical hole 54 of the piston rear lid 56 are in communication with another intake hole of the cylinder chamber 40; after the pressure air enters, it will drive the spindle 38 and the blades 39 to rotate in opposite direction; a suitable pressure volume of pressure air is guided into the cylinder chamber 40 through an exhaust hole 66 under the cylinder chamber 40 and the exhaust hole 64 in the piston rear lid 56 so as to drive the blades 39 and the spindle 38 to turn; the blades 38 and the spindle 39 would not rotate without a better exhaust passage.

After the piston rear lid 56 is assembled with the related parts thereof, the assembly is mounted into the cylindrical hole of the hydraulic piston 31; during the rivet-nut gun 11 working, the hydraulic piston 31 will move backwards. The piston rear lid 56 mounted on the outer end of the pneumatic motor assembly 57 is furnished with two intake holes 53 and 54, which are connected respectively with two separate pipes 19 and 20 in the tail lid 18; the tail lid 18 is fastened to a threaded sleeve 44 with screw bolts 69; the two separate pipes 19 and 20 in the threaded sleeve 44 would not move unintentionally. The piston rear lid 56 mounted on the front end of the tail lid 18 will move upon riveting work; between the two separate pipes 19 and 20 in the tail lid 18 and the two intake holes 53 and 54, two seal rings 46 are mounted respectively; outer surfaces of the seal rings 46 are in hermetic contact with the two intake holes 53 and 54 respectively, while the inner surface of the seal rings are in hermetic contact with the two separate pipes 19 and 20 respectively. When the piston rear lid 56 and the pneumatic motor assembly 57 move together, the two separate pipes 19 and 20 on the piston rear lid 56 would maintain in good hermetic contact condition.

The tail lid 18 on the outer end of the body shell 13 includes an outer shell 72 and two separate pipes 19 and 20; the outer shell 72 is merely a cover to fit to the shape of the body shell 13; the tail lid 18 is fastened to the body shell 13 by means of screw bolts 69. The outer end of the outer shell 72 is furnished with a plurality of small exhaust holes 29 to exhaust the pressure air. On both sides of the small exhaust holes 29, two separate pipes 19 and 20 are furnished in U-shaped design inside the outer shell 72; the center thereof is furnished with two pipe passages 28A and 28B; the plug pipes 60 and 61 on the upper ends of the separate pipes 19 and 20 are connected with the seal rings 46 of the two intake holes 53 and 54 of the piston rear lid 56. The ends of the pipe passages 48*a* and 48*b* under the separate pipes 19 and 20 are connected, in communication, with the intake passages 47*a* and 47*b* under the body shell 13; the ends of the pipe passages 48*a* and 48*b* are mounted with two O-shaped rings 74 respectively so as to provide a hermetic contact between the intake passages 47*a* and 47*b* of the body shell 13 and the pipe passages 48*a* and 48*b* of the tail lid 18, and to have the pressure air flowed through the plug pipes 60 and 61 on the upper part of the tail lid 18, and into the piston rear lid 56 behind the pneumatic motor assembly 57.

The two intake passages 47*a* and 47*b* under the body shell 13 and the pneumatic motor assembly 57 on the rear end of the body shell 13 are connected respectively with two separate pipes 19 and 20 of the tail lid 18; the center of the outer shell 72 of the tail lid 18 is furnished with a plurality of small exhaust holes 29; the piston rear lid 56 and the partition ring 41 are connected, in communication, with the cylinder chamber 40, by means of two exhaust holes 64 and 66 so as to have the pressure air flowed into the body shell 13, and into the intake holes 53 and 54 of the piston rear lid 56 on outer end of the pneumatic motor assembly 57 in order to enable the blades 38 and the spindle 39 to rotate in different directions. After the pull rod 12 of the rivet-nut gun 11 rod and the rivet nut 55 are assembled together, the pressure air in the rivet-nut gun 11 has entered a valve 50 of the piston rear lid 56 through the separate pipe 19 of the tail lid 18; a contact driving force between the rivet nut 55 and the pull rod 12 will push the valve 50 away from the valve base 51; then, the pressure air flows through the passage 65 and the cylindrical hole 43 of the partition ring 41 to enter a space beside the cylinder chamber 40 so as to drive the blades 39 and the spindle 38 to rotate; then, the rivet nut 55 and the pull rod 12 will be screwed together at a low speed.

After a rivet nut 55 is mounted on the pull rod 12 of the rivet-nut gun 11, the rivet nut 55 can be removed directly, or removed after the riveting work, i.e., the pull rod 12 and the rivet nut 55 may be separated by using the trigger 14 to control the pressure air to flow via the intake passage 47*b* under the body shell 13, the separate pipe 20, the cylindrical hole 54 of the pneumatic motor assembly 57, and the intake cylindrical hole 43 of the partition ring 41, and finally flows into the cylinder chamber 40 to drive the blades 38 and the spindle 39 to rotate; in that case, the rivet nut 55 and the pull rod 12 will be separated from each other at a low speed.

The tail lid 18 is mounted on the rear end of the body shell 13 of the rivet-nut gun; the outer shell 72 of the tail lid 18 is furnished with two separate pipes 19 and 20, which are connected respectively in communication with the two intake passages 47*a* and 47*b* under the body shell 13, and with two intake holes 53 and 54 of the piston rear lid 56 of the pneumatic motor assembly 57, and the small exhaust holes 29 in the center of the outer shell 72; then, by means of the exhaust holes 64 and 66 of the cylinder chamber 40, the pressure air after actuation will be exhausted via the small exhaust holes 29 of the outer shell 72 of the tail lid 18; the aforesaid structure would simplify the assembly parts of the rivet-nut gun 11. While the invention has been described with reference to specific embodiments it must be understood that those embodiments are susceptible :to many changes, substitutions, and modifications that will be readily apparent to those having ordinary skill in the art without departing from the scope and spirit of the invention.

What is claimed is:

1. An intake distributing device of a rivet-nut gun comprising:

a) a body shell having two separate intake passages located a lower part of a rear end of the body shell;

b) a pull rod assembly located on a front end of the body shell;

c) a pneumatic motor assembly located on a center of the rear end of the body shell and having a piston rear lid having two intake holes and an exhaust hole;

d) a threaded sleeve located on the rear end of the body shell; and e) a tail lid connected to the threaded sleeve and having:
   i) an outer shell connected to an exterior of the rear end of the body shell; and
   ii) two separate pipes located on an interior of the outer shell of the tail lid, each of the two separate pipes has a pipe passage connected to and communicating with a corresponding intake passage of the two separate intake passages and a plug pipe connected to and communicating with a corresponding intake hole of the two intake holes of the piston rear lid.

2. The intake distributing device according to claim 1, wherein the outer shell of the tail lid has a plurality of exhaust holes communicating with the exhaust hole of the piston rear lid.

3. The intake distributing device according to claim 1, wherein each of the two separate pipes of the tail lid are U-shaped pipes having the pipe passage located on a first end and the plug pipe located on a second end.

4. The intake distributing device according to claim 1, further comprising two seal rings, one of the two seal rings is located on an end of each of the two intake holes of the piston rear lid and being in hermetic contact with the plug pipe of one of the two separate pipes of the tail lid.

5. The intake distributing device according to claim 1, wherein the pneumatic motor assembly includes a cylinder chamber and a partition ring, the exhaust hole of the piston rear lid communicating with the cylinder chamber via an exhaust hole in the partition ring.

* * * * *